United States Patent
Kim

(10) Patent No.: US 6,268,933 B1
(45) Date of Patent: Jul. 31, 2001

(54) RECONSTRUCTING A SECONDARY DIFFERENTIAL VALUE IMAGE, IMAGE CONTOUR EMPHASIZING BASED ON THE RECONSTRUCTING, AND THERMAL TRANSFER RECORDING BASED ON THE CONTOUR EMPHASIZING

(75) Inventor: Tal-guk Kim, Iwate-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/149,528

(22) Filed: Sep. 8, 1998

(30) Foreign Application Priority Data

Sep. 9, 1997 (JP) ................................................ 9-284220

(51) Int. Cl.$^7$ ............................. H04N 1/50; H04N 1/58; G06K 15/02; G06T 5/00
(52) U.S. Cl. ......................... 358/1.9; 358/503; 358/532; 382/266
(58) Field of Search ........................... 358/1.9, 503, 532, 358/447, 448, 463; 382/266, 269, 263, 254, 275; 348/625, 627, 606

(56) References Cited

U.S. PATENT DOCUMENTS

| | | | |
|---|---|---|---|
| 3,641,268 | 2/1972 | Beck | 348/625 |
| 5,023,919 | * 6/1991 | Wataya | 382/263 |
| 5,050,227 | 9/1991 | Furusawa et al. | |
| 5,774,572 | 6/1998 | Caspi | |

FOREIGN PATENT DOCUMENTS

| | | | |
|---|---|---|---|
| 278698 A2 * | 8/1988 | (EP) | H04N/5/14 |
| A4 0 451 579 A2 | 3/1991 | (EP) | H04N/1/40 |
| A1 7107273A | 4/1995 | (JP) | |
| A2 8212341A | 8/1996 | (JP) | |

* cited by examiner

*Primary Examiner*—Scott Rogers
(74) *Attorney, Agent, or Firm*—Brinks Hofer Gilson & Lione

(57) ABSTRACT

It is an object to provide a reconstructing process method, for a secondary differential value image, being capable of correcting blurring at the contour portion of an original image to form an image having a sharp contour, an image contour emphasizing process method based on the reconstructing process method, and a thermal transfer printer for performing recording based on the contour emphasizing process method. For this purpose, the primary differential value and the second differential value of each pixel of an original image are calculated, the original image is scanned in horizontal and vertical directions to detect a contour line on the basis of the signs of the primary differential value and the secondary differential value, a secondary differential value at a position shifted from the interest pixel by an arbitrary width is substituted as a secondary differential value located at the interest pixel to reconstruct the secondary differential value image.

5 Claims, 20 Drawing Sheets

(4 of 20 Drawing Sheet(s) Filed in Color)

STEP EDGE

INTEREST PIXEL $f(x)$ $\dfrac{df}{dx}$ $\dfrac{d^2 f}{dx^2}$ $f(x) - \dfrac{d^2 f}{d^2 x}$

RECONSTRUCTING A SECONDARY DIFFERENTIAL VALUE IMAGE, IMAGE CONTOUR EMPHASIZING BASED ON THE RECONSTRUCTING, AND THERMAL TRANSFER RECORDING BASED ON THE CONTOUR EMPHASIZING

BACKGROUND OF THE INVENTION

1. Field of the Invention

The present invention relates to a reconstructing process method for a secondary differential value image, an image contour emphasizing process method based on the reconstructing process method, and a thermal transfer printer for performing recording based on the contour emphasizing process method and, more particularly, to a reconstructing process method, for a secondary differential value image, which corrects blurring at a contour portion of an original image to perform recording, an image contour emphasizing process method based on the reconstructing process method, and a thermal transfer printer for performing recording based on the contour emphasizing process method.

2. Description of the Related Art

Conventionally, a thermal transfer printer which comprises an image scanner serving as a means for reading information of an original such as an image or a document and has an easy copy function for performing a conversion process for the information loaded by the image scanner as recording data and causing a recording mechanism having a recording head to perform recording based on the recording data has been proposed.

When such a conventional thermal transfer printer comprising an image performs a conversion process image information of an original as recording data, in order to perform recording such that the contour portion of the original image, i.e., an edge is emphasized (made sharp), a contour emphasizing process for an image is performed.

A conventional contour emphasizing process for an original image will be described below with reference to FIG. 27.

FIG. 27A shows a function f(x) representing a variable density section of an edge of an original image; FIG. 27B shows the primary differential df/dx of the function f(x), and FIG. 27C shows the secondary differential $d^2f/dx^2$ of the function f(x). In the conventional technique, as shown in FIG. 27D, a contour emphasizing process represented by the process of subtracting the function in FIG. 27C from the function in FIG. 27A, i.e., $f(x)-d^2f/dx^2$ is performed. When such a process is performed, as shown in FIG. 27C, the secondary differential $d^2f/dx^2$ has positive and negative values before and after the slope of the edge. For this reason, a change in density of the edge can be enlarged by the function $f-d^2f/dx^2$ in FIG. 27D.

Such an effect is similar to the Mach effect observed by a sense of a person. When several belt-like patterns having different brightnesses are seen, a person generally feels as if the boundary between belts in which density changes in a step-like manner is temporarily darkened and then brightened again.

However, in an image conventional contour emphasizing process method and a thermal transfer printer for performing recording based on this method, as shown in FIG. 27D, an edge emphasizing process output value is overshot or undershot. For this reason, if an original image is a blurred image, in order to emphasize the contour portion of the original image to obtain a sharp contour, the contour unnaturally appears in the actual recorded image, or the peripheral portion of the contour portion is blurred.

SUMMARY OF THE INVENTION

It is an object of the present invention to provide a reconstructing process method, for a secondary differential value image, being capable of correcting blurring at the contour portion of an original image to form an image having a sharp contour, an image contour emphasizing process method based on the reconstructing process method, and a thermal transfer printer for performing recording based on the contour emphasizing process method.

The reconstructing process method is characterized in that a primary differential value and a secondary differential value of each pixel in an original image are calculated, the original image is scanned in horizontal and vertical directions to detect a contour line on the basis of the signs of the primary differential value and the secondary differential value, and a secondary differential value located at a position which is shifted in two normal directions for a tangent to each interest pixel of the contour line from the interest pixel by an arbitrary width is substituted as a secondary differential value located at the interest pixel.

The reconstructing process method is characterized in that, when a pair of pixels of contour lines adjacent to each other at a predetermined interval smaller than the width of the pixel exist in an original image, the pixels of the contour lines and pixels sandwiched between the contour lines are excluded from pixels subjected to a reconstructing process for a secondary differential image.

The contour emphasizing process method is characterized in that an output value of a secondary differential value image obtained by the reconstructing process method for a secondary differential value image is multiplied by an emphasizing coefficient, and the resultant value is added to or subtracted from an output value of an original image to emphasize the contour of the image.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DESCRIPTION OF THE PREFERRED EMBODIMENTS

A reconstructing process method for a secondary differential value image according to the present invention is performed in the following order. That is, a contour line is detected from an original image, i.e., edge detection is performed (step ST1); a region to be emphasized is marked to determine a region for thickening the detected edge by the width of several pixels (step ST2); a region in which an interval between contour lines is small is detected to be marked, i.e., an uneven region is marked (step ST3); and a secondary differential value image is reconstructed to emphasize pixels of a contour portion (step ST4).

Figure 1A:
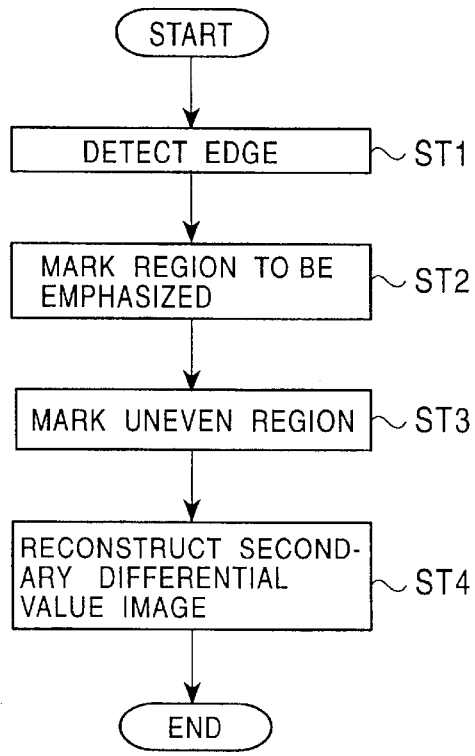
FIG. 1A is a flow chart of a reconstructing process method for a secondary differential value image according to the present invention.
Figure 1B:
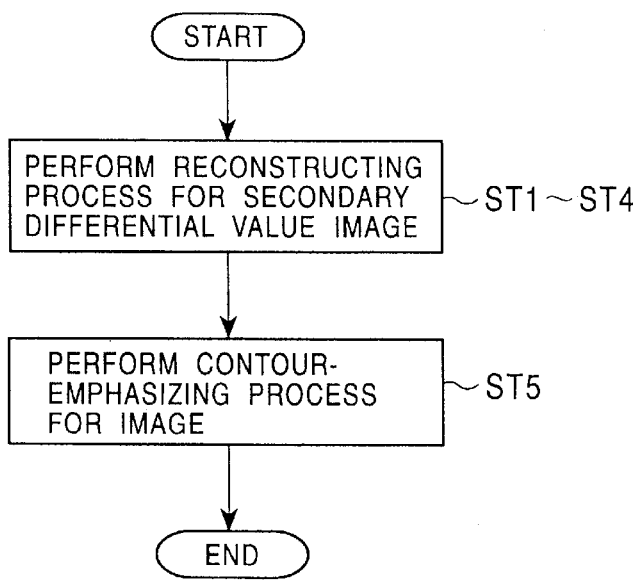
FIG. 1B is a flow chart showing an image contour emphasizing process method using a reconstructing process method for a secondary differential value image according to the present invention.

An image contour emphasizing process method according to the present invention is designed such that, as shown in the flow chart in FIG. 1B, each pixel is subjected to an emphasizing process (step ST5) on the basis of an output value of a secondary differential value image obtained by the reconstructing process.

The processes in the steps will be described below in detail.

Figure 3:
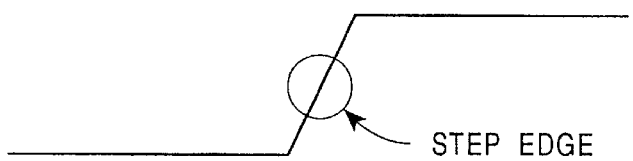
FIG. 3 is a view for explaining the shape of a step edge in this embodiment.
Figure 4:
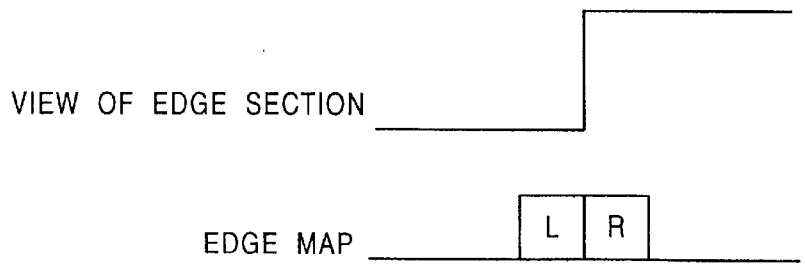
FIG. 4 is a view for explaining an edge map in this embodiment.

The edge detection in step ST1 will be described below with reference to FIGS. 2 to 4.

Figure 2:
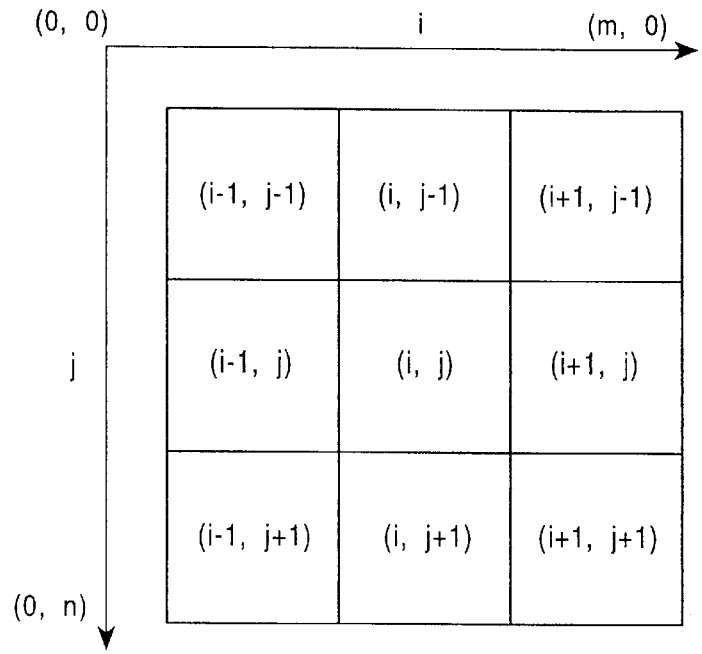
FIG. 2 is a view for explaining the expression of an original image in this embodiment.

FIG. 2 shows an example of a coordinate map of an input image. Here, an image of m (lateral)×n (longitudinal) is expressed. In this coordinate map, the horizontal direction of the original image is set to be an i-direction, and the vertical direction is set to be a j-direction. When the luminance of the input image is expressed by I(i,j) with reference to the coordinate map, the primary differentials of an image at a certain interest pixel (i,j) in an x-direction (horizontal direction) and a y-direction (vertical direction) are defined by the following equations:

x-direction: $dx(i,j)=I(i+step,j)-I(i-step,j)$   Equation (1)

y-direction: $dy(i,j)=I(i,j+step)-I(i,j-step)$   Equation (2)

where step is a positive number.

A secondary differential at the interest pixel (i,j) is defined by the following equation:

$L(i,j)=4\times I(i,j)+I(i+step,j)+I(i-step,j)+I(i,j+step)+I(i,j-step)$   Equation (3).

A step edge is detected from the primary and secondary differential values according to the following procedure.

With respect to the input image, primary differential output values dx(i,j) and dy(i,j) in the x-direction and the y-direction are calculated from Equations (1) and (2).

With respect to the input image, a secondary differential output value L(i,j) is calculated from Equation (3).

The secondary differential output value L(i,j) is independently scanned in the x-direction and the y-direction to form an edge map in the x-direction and an edge map in the y-direction.

More specifically, the secondary differential output value L(i,j) is scanned to obtain a pair of adjacent pixels which are changed from a negative state to a positive state or from the positive state to the negative state (0 is included in the negative state) and have secondary differential values (absolute values) larger than a threshold value.

Of the obtained pairs of pixels in the x-direction and the y-direction, only a pair of pixels which have primary differential values having the same sign, i.e., a pair of pixels having primary differential values whose product is positive are limitedly detected as a contour line (step edge). This step edge has a shape shown in FIG. 3.

Labels are sequentially added to the detected pair of edges from the left to the right in the x-direction. In the y-direction, the upper and lower sides are defined as the left and right sides in advance, respectively, and labels are sequentially added to the detected pair of edges from the left to the right. The addition of the labels L and R is performed to determine an emphasizing direction in the emphasizing process. More specifically, since a pair of edges (two pixels) are detected, an emphasized region is added in the forward and backward directions of a gradient direction (to be described later) obtained from the center of the two pixels, and, on the basis of this direction, the direction of parallel shift of a secondary differential used in the emphasizing process is determined. For this reason, the labels L and R must be determined to discriminate the forward direction from the backward direction with respect to the gradient direction.

Here, actual addition of labels L and R is described. For example, it is assumed that the primary differential values of the pair of edges obtained by a threshold process are represented by left=dx(i−1,j) and right=dx(i,j). In this case, when these values satisfy the condition left×right>0, L(Left): label added to position (i−1,j)

R(right): label added to position (i,j)

else: ZERO.

The labeling process is performed in the x-direction and the y-direction to form edge maps which are labeled.

The step width which is a parameter of Equations (1), (2), and (3) is in proportion to the degree of definition of the detected edge. For this reason, when the definite edge is detected, the step width is decreased. When a rough edge is detected, the step width is gradually increased. In this embodiment, since the definite portion is emphasized by a contour emphasizing process, the step width is appropriately set to be about 1 to 2.

Marking of a region to be emphasized in step ST2 in FIG. 1A will be described below.

Figure 5:
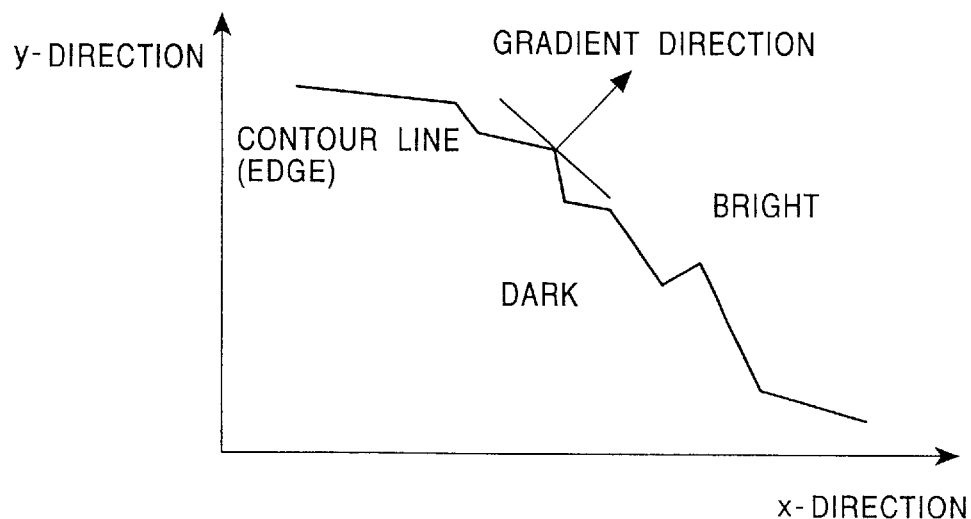
FIG. 5 is a view for explaining a gradient direction of an interest pixel in this embodiment.
Figure 6:
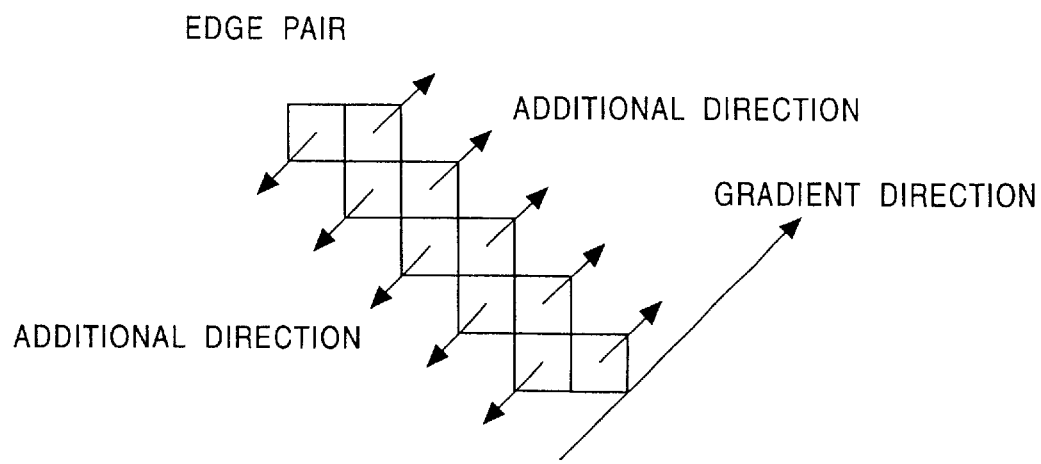
FIG. 6 is a view for explaining an edge pair and an additional direction in this embodiment.

A reconstructing process for a secondary differential value image is to emphasize a region in which the step edge detected in step ST1 is thickened by the width of several pixels. For this reason, the marking of the region to be emphasized is performed by adding pixels to be emphasized to an additional direction after the additional direction of the region to be emphasized is determined. In this embodiment, as shown in FIGS. 5 and 6, a normal direction (this is called a "gradient direction" with respect to the tangent of the step edge is calculated, and a region to be emphasized is determined to the forward direction and backward direction of the gradient direction. A direction in which the region to be emphasized is added to the pixels of the pair of edges is determined by the gradient direction and the combination labels.

Determination of the additional direction of the region to be emphasized will be described below.

The determination of the additional direction of the region to be emphasized is roughly divided into the following four steps. That is, as the first step, a combination label is added to an interest pixel; as the second step, the gradient direction of a step edge is calculated; as the third step, a combination label is added to the interest pixel in an inclined direction; and as the fourth step, an additional direction is determined.

As the first step, a combination label is added to the interest pixel by the following manner. That is, combination labels shown in Table 1 are added by the combination of the labels from the labels L, R, and ZERO in the x-direction and the y-direction marked on the edges by the edge detection in step ST1.

TABLE 1

| Combination of Labels | | |
|---|---|---|
| x-direction | y-direction | Combination |
| L | L | L-L |
| L | R | L-R |
| L | ZERO | L-ZERO |
| R | L | R-L |
| R | R | R-R |
| R | ZERO | R-ZERO |
| ZERO | L | ZERO-L |
| ZERO | R | ZERO-R |

As the second step, calculation of a gradient direction will be described below.

The gradient direction means a direction in which luminance is changed from low to high at a certain edge, and represents a normal direction with respect to a tangent at an interest pixel on an edge (contour line). The gradient direction is calculated by using primary differential values of interest pixels in the x-direction and the y-direction. Several directions into which the gradient directions are classified can be freely selected to some extent. In this embodiment, a case wherein the gradient directions are classified into 16 directions will be described below.

In this embodiment, at a certain interest pixel, four values, i.e., an edge label $x_e$ in the horizontal direction, an edge label $y_e$ in the vertical direction, a primary differential value $dx_e$ in the x-direction (horizontal direction), and a primary differential value $y_e$ in the y-direction (vertical direction) are given.

Figure 7:
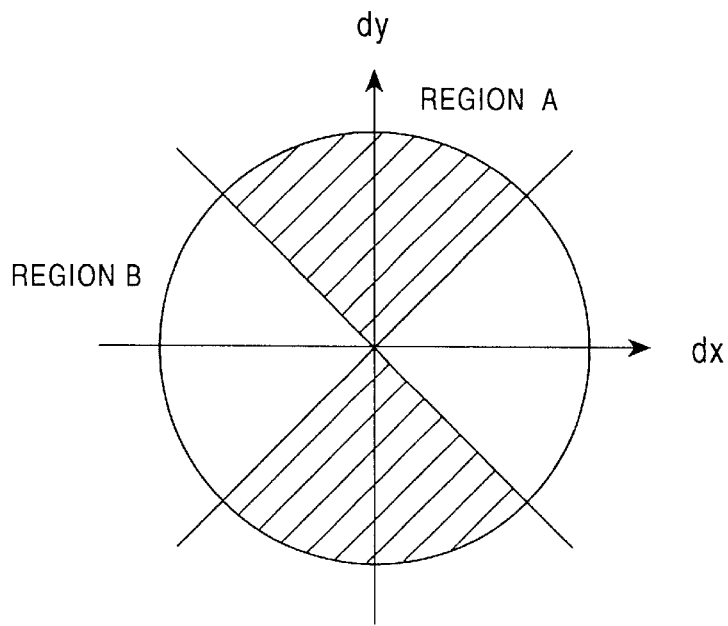
FIG. 7 is a view for explaining classification of regions related to calculation of the gradient direction of the interest pixel in this embodiment.

When $dx_e$ and dye are compared with each other, classification shown in FIG. 7 can be performed. If $|dy_e|>|dx_e|$ is satisfied, the gradient direction is classified into a region A indicated by a hatched portion in FIG. 7. If $|dy_e|\leq|dx_e|$, the gradient direction is classified into a region B in FIG. 7.

Figure 8:
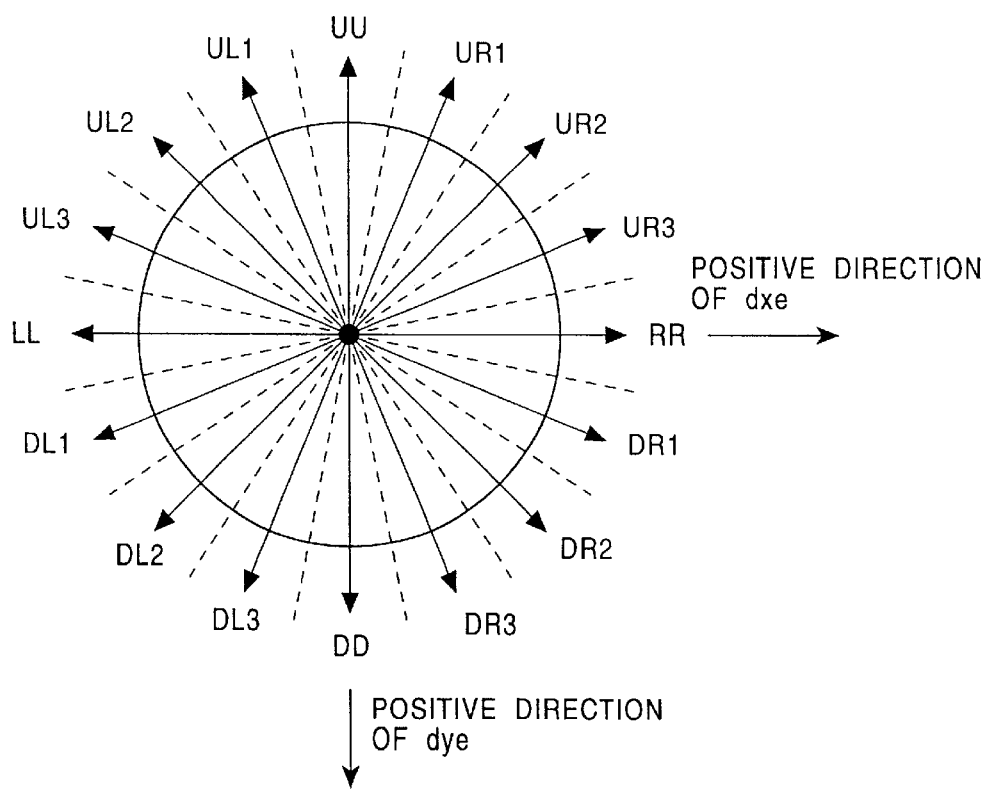
FIG. 8 is a view for explaining calculation of 16 gradient directions of the interest pixel in this embodiment.
Figure 9A:
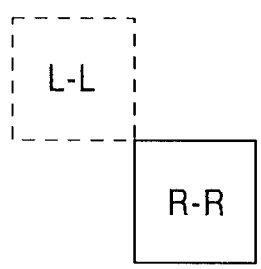
FIGS. 9A to 9D are views for explaining addition of combination labels in inclined directions of an interest pixel which is labeled in this embodiment.
Figure 9B:
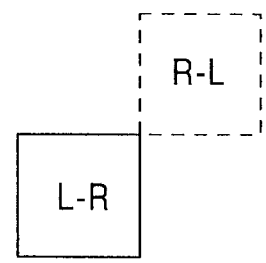
Figure 9C:
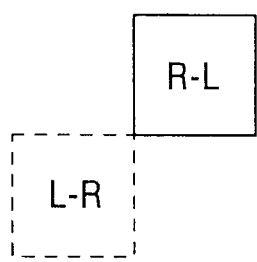
Figure 9D:
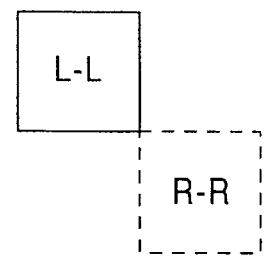

On the basis of the ratio of $dx_e$ to $dy_e$ and the combination of the signs of primary differential values, the gradient directions are classified into 16 directions shown in FIG. 8. Since the angles of the directions are divided by 16, the directions are given every 360°/16=22.5°. Dotted lines in FIG. 8 indicate boundaries between the directions.

The conditions of the ratio of $dx_e$ to $dy_e$ at which 16 directions are allowed and the combination of signs will be described below.

As preconditions, $$a/b=\tan(11.25°)=0.1989,$$

$$a/b=\tan(22.50°)=0.4121,$$

and $$a/b=\tan(33.75°)=0.6682$$

are set, where a and b are given by:

$$a=|dx_e|, \; b=|dy_e| \text{ in region A}$$

$$a=|dy_e|, \; b=|dx_e| \text{ in region B.}$$

Conditions set to include gradient directions in the respective conditions are as follows.

(1) Conditions set to include a gradient direction in direction UU:

$|dy_e|>|dx_e|$ (region A)

$0.0 \leq |dx_e|/|dy_e| < 0.1989$ sign: $dy_e < 0$ (2) Conditions set to include a gradient direction in direction UR1:

$|dy_e|>|dx_e|$ (region A)

$0.1989 \leq |dx_e|/|dy_e| < 0.6682$ sign: $dx_e > 0$ and $dy_e < 0$ (3) Conditions set to include a gradient direction in direction UR2:

$|dy_e|>|dx_e|$ (region A)

$0.6682 \leq |dx_e|/|dy_e| \leq 1.0$ sign: $dx_e > 0$ and $dy_e < 0$ $|dy_e| \leq |dx_e|$ (region B)

$0.6682 \leq |dy_e|/|dx_e| \leq 1.0$ sign: $dx_e > 0$ and $dy_e < 0$ (4) Conditions set to include a gradient direction in direction UR3:

$|dy_e| \leq |dx_e|$ (region B)

$0.1989 \leq |dy_e|/|dx_e| < 0.6682$ sign: $dx_e > 0$ and $dy_e < 0$ (5) Conditions set to include a gradient direction in direction RR:

$|dy_e| \leq |dx_e|$ (region B)

$0.0 \leq |dy_e|/|dx_e| < 0.1989$ sign: $dx_e > 0$ (6) Conditions set to include a gradient direction in direction UR1:

$|dy_e| \leq |dx_e|$ (region B)

$0.1989 \leq |dy_e|/|dx_e| < 0.6682$ sign: $dx_e > 0$ and $dy_e < 0$ (7) Conditions set to include a gradient direction in direction DR2:

$|dy_e|>|dx_e|$ (region A)

$0.6682 \leq |dx_e|/|dy_e| \leq 1.0$ sign: $dx_e > 0$ and $dy_e > 0$ $|dy_e| \leq |dx_e|$ (region B)

$0.6682 \leq |dy_e|/|dx_e| \leq 1.0$ sign: $dx_e > 0$ and $dy_e > 0$ (8) Conditions set to include a gradient direction in direction DR3:

$|dy_e|>|dx_e|$ (region A)

$0.1989 \leq |dx_e|/|dy_e| < 0.6682$ sign: $dx_e > 0$ and $dy_e > 0$ (9) Conditions set to include a gradient direction in direction DD:

$|dy_e|>|dx_e|$ (region A)

$0.0 \leq |dx_e|/|dy_e| < 0.1989$ sign: $dy_e > 0$

(10) Conditions set to include a gradient direction in direction DL3:

$|dy_e|>|dx_e|$ (region A)

$0.1989 \leq |dx_e|/|dy_e| < 0.6682$ sign: $dx_e < 0$ and $dy_e > 0$

(11) Conditions set to include a gradient direction in direction DL2:

$|dy_e|>|dx_e|$ (region A)

$0.6682 \leq |dx_e|/|dy_e| \leq 1.0$ sign: $dx_e < 0$ and $dy_e > 0$ $|dy_e| \leq |dx_e|$ (region B)

$0.6682 \leq |dy_e|/|dx_e| \leq 1.0$ sign: $dx_e < 0$ and $dy_e > 0$

(12) Conditions set to include a gradient direction in direction DL1:

$|dy_e| \leq |dx_e|$ (region B)

$0.1989 \leq |dy_e|/|dx_e| < 0.6682$ sign: $dx_e < 0$ and $dy_e > 0$

(13) Conditions set to include a gradient direction in direction LL:

$|dy_e| \leq |dx_e|$ (region B)

$0.0 \leq |dy_e|/|dx_e| < 0.1989$ sign: $dx_e < 0$

(14) Conditions set to include a gradient direction in direction UL3:

$|dy_e| \leq |dx_e|$ (region B)

$0.1989 \leq |dy_e|/|dx_e| < 0.6682$ sign: $dx_e < 0$ and $dy_e > 0$

(15) Conditions set to include a gradient direction in direction UL2:

$|dy_e|>|dx_e|$ (region A)

$0.6682 \leq |dx_e|/|dy_e| \leq 1.0$ sign: $dx_e<0$ and $dy_e<0$ $|dy_e| \leq |dx_e|$ (region B)

$0.6682 \leq |dy_e|/|dx_e| \leq 1.0$ sign: $dx_e<0$ and $dy_e<0$

(16) Conditions set to include a gradient direction in direction UL1:

$|dy_e|>|dx_e|$ (region A)

$0.1989 \leq |dx_e|/|dy_e| < 0.6682$ sign: $dx_e<0$ and $dy_e<0$

With the above processes, a label in a gradient direction, i.e., in this embodiment, one of 16 directions is given to each edge image.

As gradient directions, 16 or more directions, e.g., 32 directions can also be set. However, the differences between results appearing in images cannot be visually recognized.

As the third step in determination of an additional direction of a region to be emphasized, addition of a combination label in an inclined direction of an interest pixel will be described below.

Addition of the combination label in the inclined direction of the interest pixel is performed as follows. That is, as shown in FIG. 9, if no label exists in a pixel, with reference to a pixel label in an inclined direction indicated by a dotted line, a label is added to the pixel having a combination between interest pixels indicated by solid lines.

As the fourth step, determination of an additional direction will be described below.

As the additional direction, as shown in Table 2, one direction of 16 directions is selected by combination labels of respective edge pixels and a gradient direction.

TABLE 2

Determination of Additional Direction of Interest Pixel

| Gradient Direction | Combination Label | Additional Direction |
|---|---|---|
| UU, DD | L-L, ZERO-L, R-L | UU |
| | L-R, ZERO-R, R-R | DD |
| UR1, DL3 | L-L, ZERO-L, R-L, R-ZERO | UR1 |
| | L-ZERO, L-R, ZERO-R, R-R | DL3 |
| UR2, DL2 | ZERO-L, R-L, R-ZERO | UR2 |
| | L-ZERO, L-R, ZERO-R | DL2 |
| UR3, DL1 | ZERO-L, R-L, R-ZERO, R-R | UR3 |
| | L-L, L-ZERO, L-R, ZERO-R | DL1 |
| RR, LL | R-L, R-ZERO, R-R | RR |
| | L-L, L-ZERO, L-R | LL |
| DR1, UL3 | R-L, R-ZERO, R-R, ZERO-R | DR1 |
| | ZERO-L, L-L, L-ZERO, L-R | UL3 |
| DR2, UL2 | R-ZERO, R-R, ZERO-R | DR2 |
| | ZERO-L, L-L, L-ZERO | UL2 |
| DR3, UL1 | R-ZERO, R-R, ZERO-R, L-R | DR3 |
| | ZERO-L, L-L, L-ZERO, R-L | UL1 |

With the above processes, an additional direction of a pixel to be emphasized to each edge pixel is given.

Addition of a pixel to be emphasized will be described below.

The addition of a pixel to be emphasized is performed according to the additional direction given to each of the above interest edge pixel. A pixel width (additional pixel width) which is twice a step width given when a primary differential value and a secondary differential value are calculated is added as a region to be emphasized. Methods of adding pixels change depending on the additional directions.

More specifically, when the direction "UU, DD, LL, or RR" is set, pixels corresponding to the width of added pixels are added from an interest pixel in an additional direction to be marked.

Figure 10:
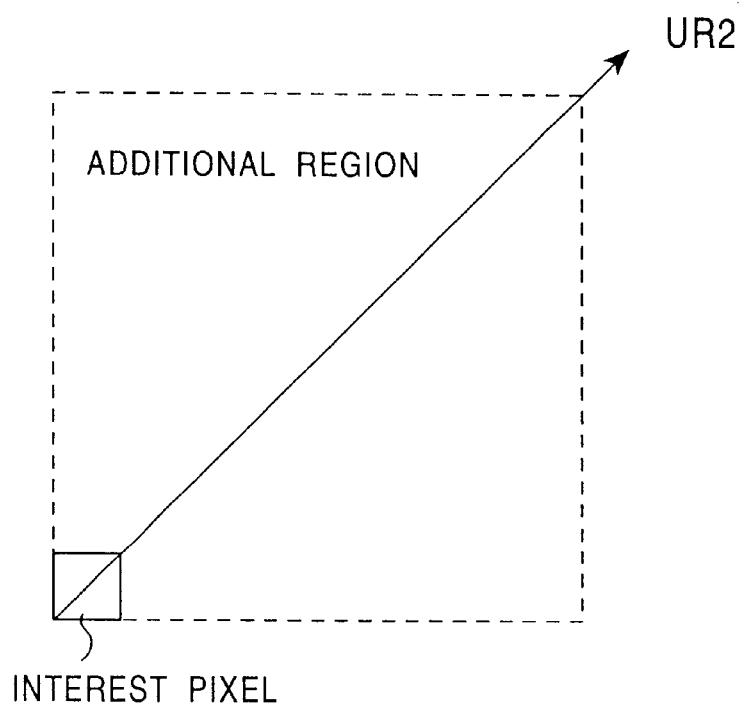
FIG. 10 is a view for explaining a region to be emphasized in this embodiment with reference to direction UR2.

When the direction "UR2, UL2, DR2, or DL2" is set, a region in which an additional direction from an interest pixel serves as a diagonal direction of a square, and a square region which has one side having a length corresponding to the width of the added pixels is marked. For example, when the direction UR2 is set, a square region shown in FIG. 10 is an additional region of a pixel to be emphasized.

Figure 11:
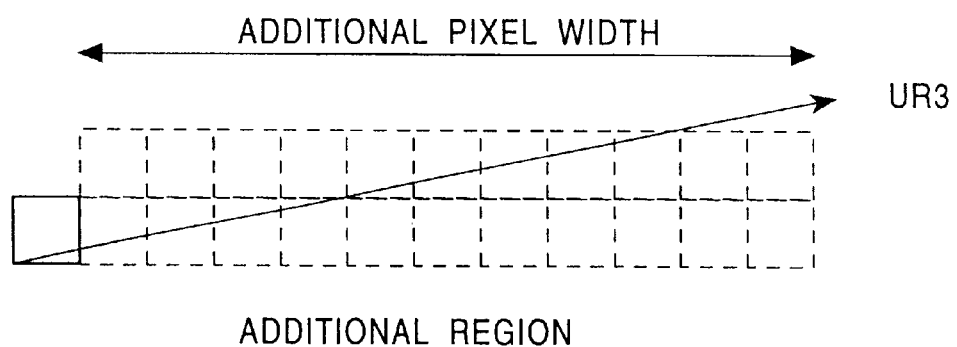
FIG. 11 is a view for explaining a region to be emphasized in this embodiment with reference to direction UR3.

When the direction "UR1, UR3, UL1, UL3, DR1, DL1, or DL3 is set, a rectangular region which has one side having a length corresponding to the width of the added pixels along the additional direction and has one side having a length corresponding to the width of two pixels is marked. For example, when the direction UR3 is set, a rectangular region shown in FIG. 11 is an additional region of a pixel to be emphasized.

As described above, marking of a region to be emphasized in step ST2 is completed.

Marking of an uneven region in step ST3 in FIG. 1A will be described below.

Figure 12:
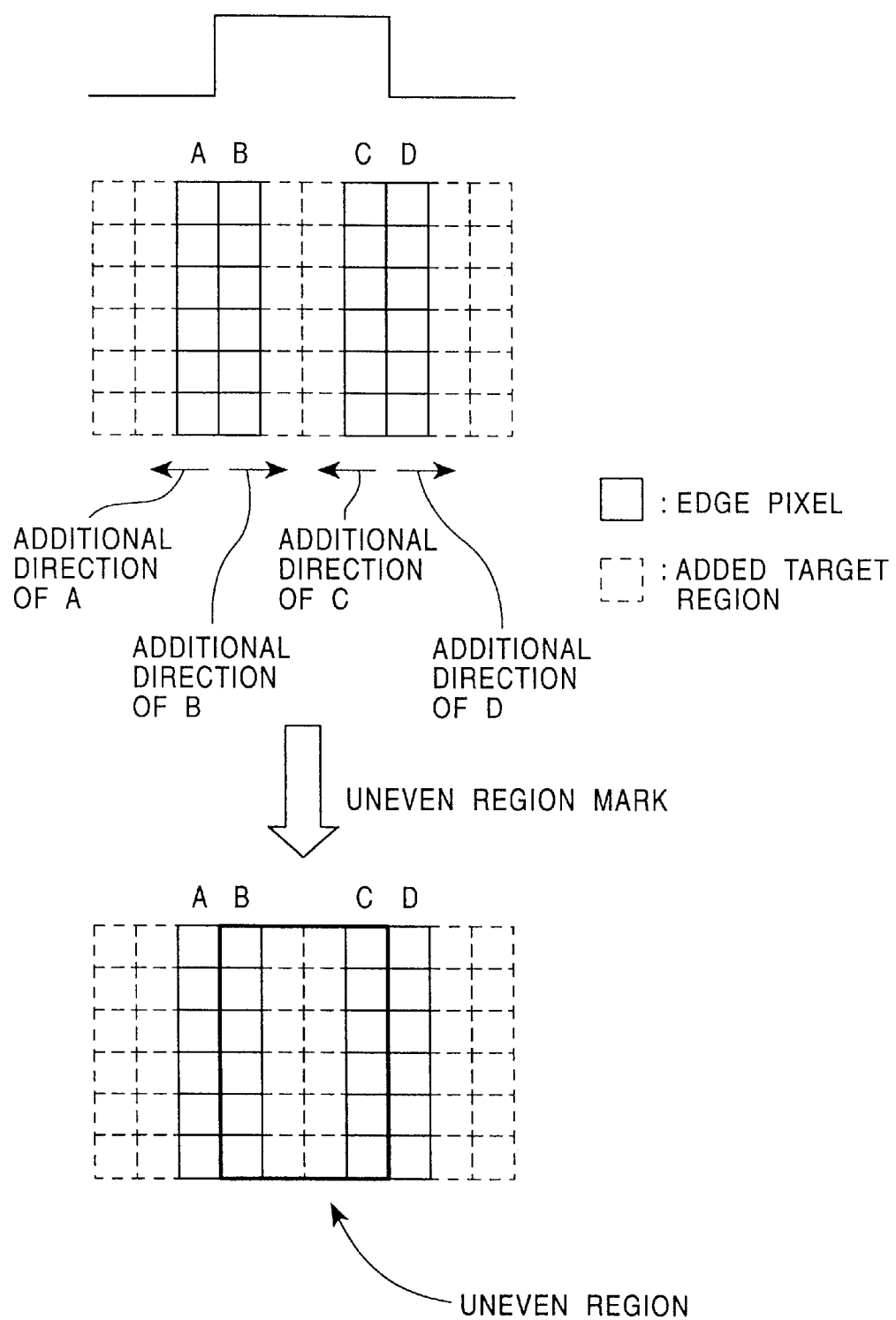
FIG. 12 is a view for explaining an uneven region in this embodiment.

The uneven region is called a region in which step edges are adjacent to each other by a narrow interval between contour lines to form an uneven portion. This region is shown in FIG. 12. FIG. 12A shows a sectional shape of a certain step edge, and FIG. 12B shows an additional direction of an emphasized pixel. In FIG. 12B, reference symbols A to D denote pairs of edges, respectively; A, the left pixel of one pair of edges; B, the right pixel of the same pair of edges; C, the left pixel of an adjacent pair of edges; and D, the right pixel of the same pair of edges. FIG. 12C shows an uneven region and a target region. In FIG. 12C, a range surrounded by a bold line indicates the uneven region.

Figure 13:
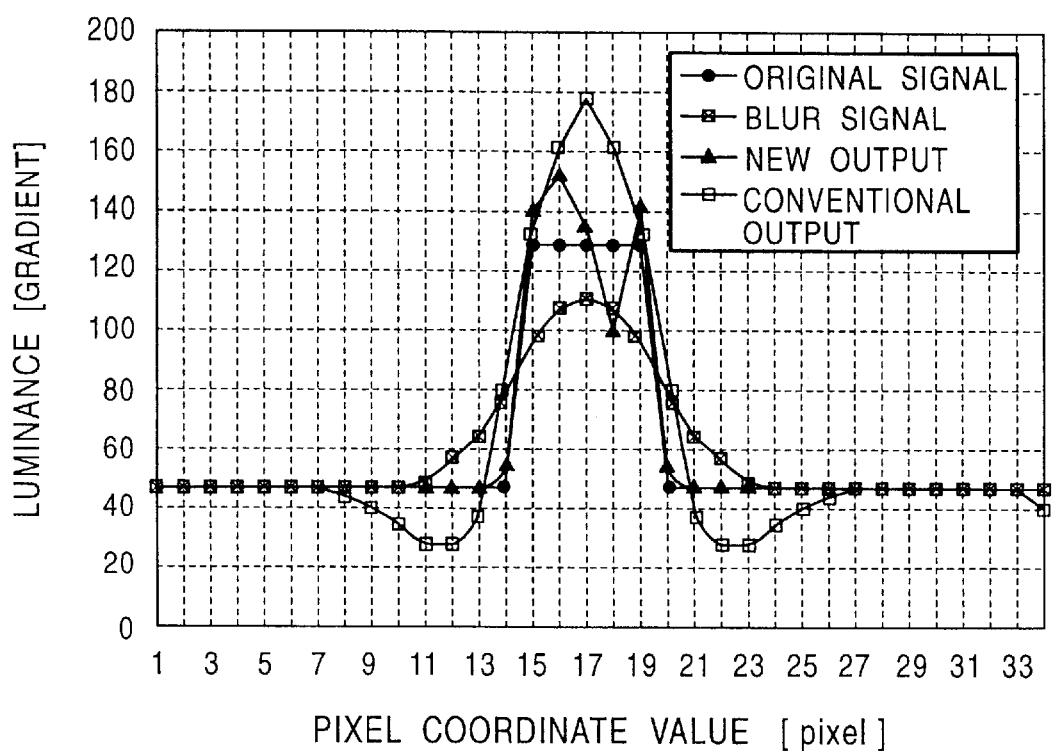
FIG. 13 is a graph showing an output value as a failure example when an emphasizing process is performed to a projection edge.

In such a region in which uneven portions are repeated within a small range, reconstruction of a secondary differential value image (to be described later) is not properly performed, and a contour emphasizing process cannot be effectively performed. FIG. 13 is a view for explaining an output value when an emphasizing process is performed by a secondary differential value image reconstructed with respect to a projection edge. As shown in FIG. 13, the emphasizing process is performed by a reconstructed secondary differential value image, an output value between the projection edges sharply increases or decreases. When the emphasizing process is performed by using a conventional secondary differential value image which is not reconstructed, both the sides of a projection edge is undershot.

In a region having the above probability, an interval between adjacent step edges is smaller than a length four times the step width (the width of pixels added to each edge is smaller than 2×step width), and two step edges form an uneven portion. Here, a region sandwiched by the two edges is defined as an uneven region.

Figure 14A:
FIGS. 14A to 14C are views for explaining combination labels serving as objects for an uneven region in this embodiment.
Figure 14B:
Figure 14C:
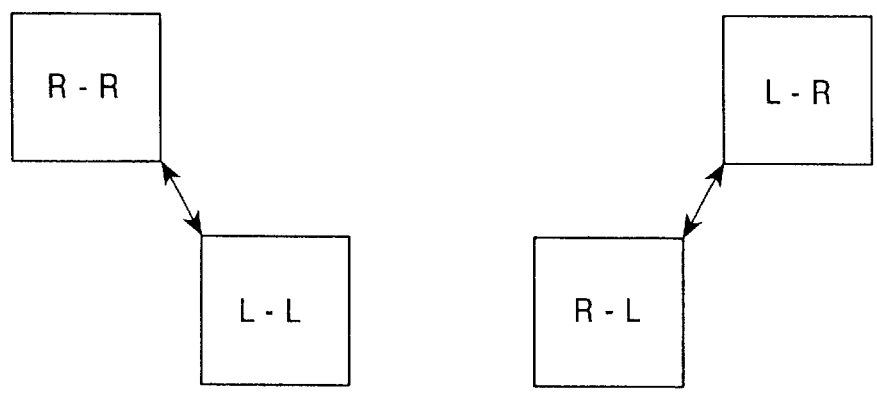

A contour portion including the uneven region is partially excluded from pixels subjected to a reconstructing process for a secondary differential value image. In determination of the region excluded from the object to be reconstructed, two adjacent edges having a pixel interval larger than the width of two pixels and smaller than 4×step width in an edge map in an x-direction and a y-direction are detected. In the detected pair of edge pixels, the above combination labels are marked. A pair of edges having a pixel interval which is 2 to 4×step width and constituting a combination in lateral, longitudinal, and diagonal directions in FIG. 14 are detected. A pixel sandwiched between these edges is marked as an uneven region. The pixel is excluded from a pixel subjected to a reconstructing process for a secondary differential value image, i.e., the pixel has the original secondary differential value of the corresponding pixel.

Figure 15:
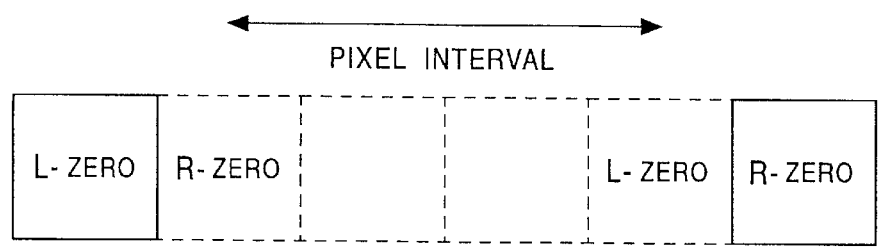
FIG. 15 is a view for explaining an emphasizing process for an uneven region in this embodiment.
Figure 16:
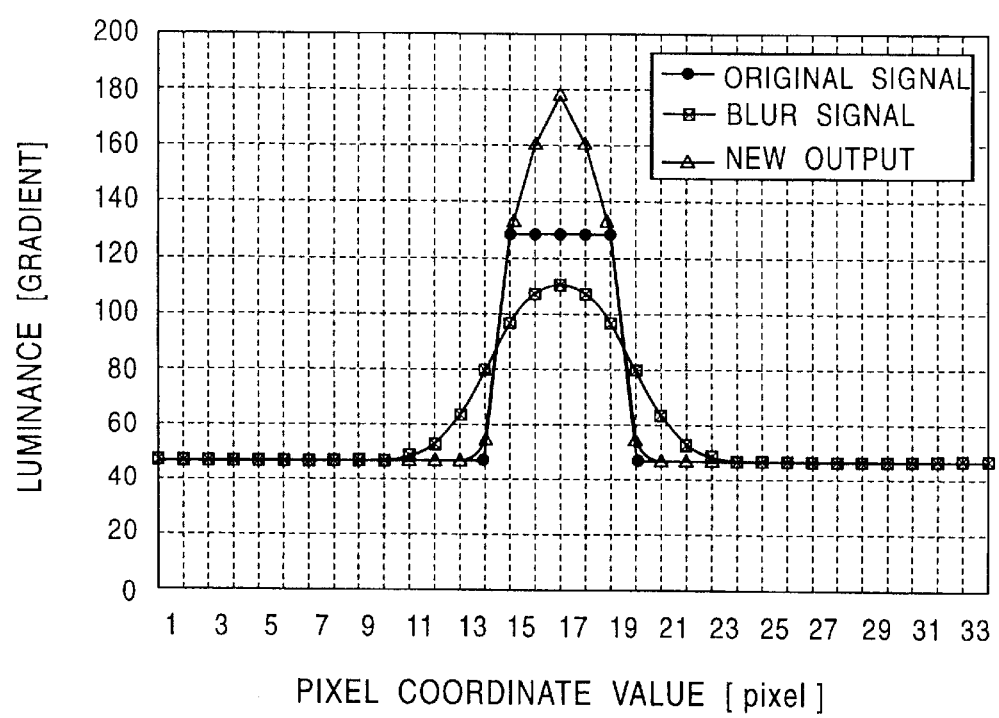
FIG. 16 is a graph showing a synthesized output value when an emphasizing process is performed to a projection edge in this embodiment.

As shown in FIG. 15, additional regions to be emphasized on the left of an L-ZERO label and the right of an R-ZERO label are subjected to a reconstructing process for a secondary differential value image. In the pixels between these regions, a secondary differential value image is not reconstructed as an uneven edge region, and a secondary differential value at the pixel position is left. A waveform near the uneven region obtained by the process is shown in FIG. 16. When FIG. 16 is compared with FIG. 13, it is understood that overshooting and undershooting are prevented to obtain a stable output.

Reconstruction of a secondary differential value image in step ST4 in FIG. 1A will be described below.

Figure 17A:
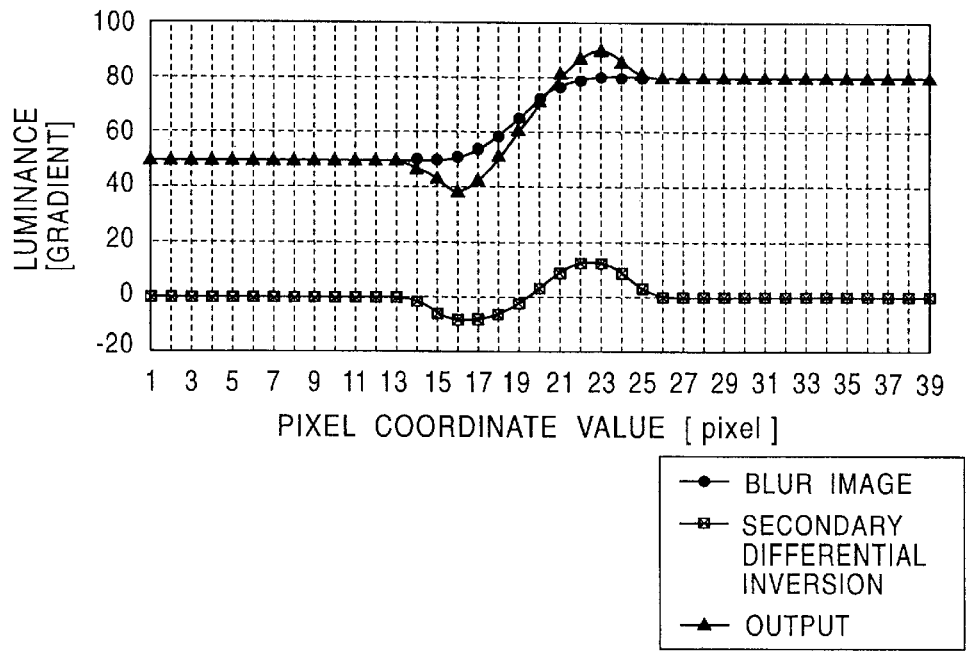
FIG. 17A is a graph showing an output value obtained by a conventional emphasizing process used as a comparative example.

According to additional directions of respective pixels in a region to be emphasized obtained by the above process, a secondary differential value is image is reconstructed. At this time, when a contour emphasizing process is performed by directly using a secondary differential value in the following step ST5 as in a prior art, as shown in FIG. 17A, unnatural overshooting or undershooting occurs. This is because the peak of the secondary differential value of a blurred contour portion (edge) in an image becomes far away from the edge to both the sides as the degree of blurring increases.

In this embodiment, a secondary differential value located at peaks on both the sides of the edge, i.e., a position where a secondary differential value parallelly shifted in a direction far away from the center of the edge by a predetermined width is substituted for each pixel marked as a region to be emphasized to reconstruct the secondary differential value image.

Figure 17B:
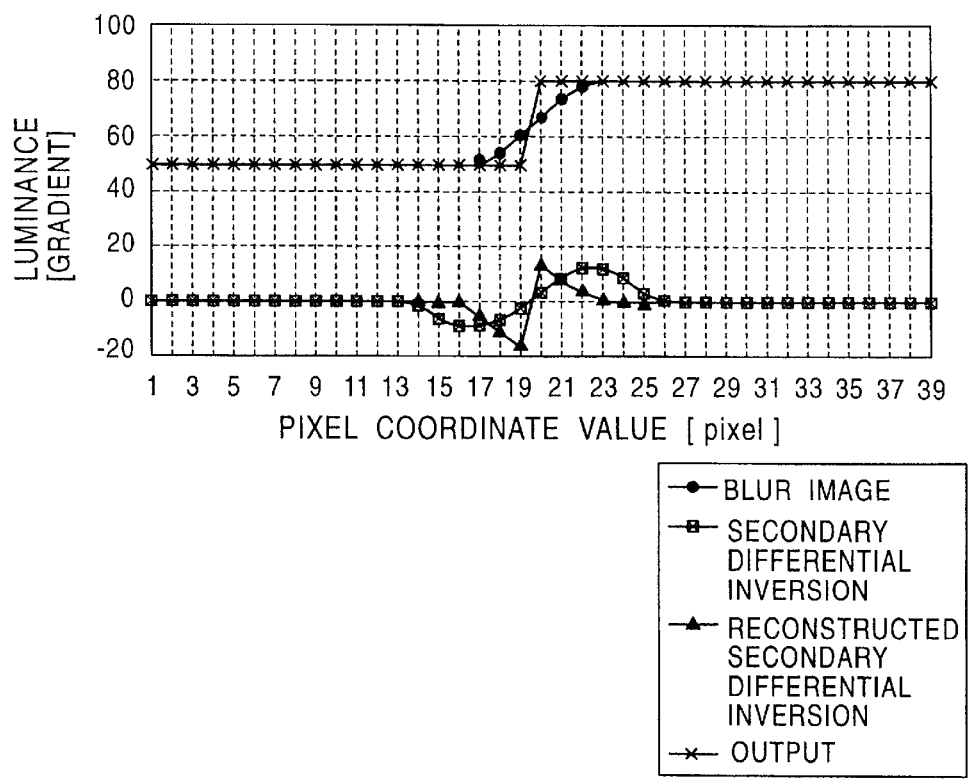
FIG. 17B is a graph showing an output value obtained by an emphasizing process according to this embodiment.

FIG. 17B shows output waveforms obtained when the contour emphasizing process in the following process step ST5 is performed by using a secondary differential image obtained by reconstruction for a secondary differential value image of this embodiment.

When these output waveforms are compared with each other, it is understood that overshooting and undershooting can be prevented by an emphasizing process using a reconstructed secondary differential value image.

Assumed that a secondary differential value at a position parallelly shifted from an interest image is substituted as the secondary differential value of the interest pixel, and that a reconstructed secondary differential value is represented by $S(i,j)$. In this case, the value $S(i,j)$ is calculated by equations shown in Table 3 according to the additional directions of the respective pixels in a region to be emphasized.

In Table 3, "Shift" denotes a shift width, i.e., an integer which is larger than 0 or equal to or smaller than the step width.

TABLE 3

Secondary Differential Value S(i,j) after Correction for Additional Directions of Respective Pixels in Region to be Emphasized

| Shift Pixel Width | | Additional Direction | Secondary Differential Value after Correction |
|---|---|---|---|
| x-direction | y-direction | | |
| dx = Shift | dy = Shift | UU | L(i, j−dy) |
| dx = Shift | dy = Shift | DD | L(i, j + dy) |
| dx = Shift | dy = Shift | LL | L(i − dx, j) |
| dx = Shift | dy = Shift | RR | L(i + dx, j) |
| dx = Shift | dy = Shift | UL2 | L(i − dx, j − dy) |
| dx = Shift | dy = Shift | UR2 | L(i + dx, j − dy) |
| dx = Shift | dy = Shift | DL2 | L(i − dx, j + dy) |
| dx = Shift | dy = Shift | DR2 | L(i + dx, j + dy) |
| dx = Shift/2 | dy = Shift | UL1 | L(i − dx, j − dy) |
| dx = Shift/2 | dy = Shift | UR1 | L(i + dx, j − dy) |
| dx = Shift/2 | dy = Shift | DL3 | L(i − dx, j + dy) |
| dx = Shift/2 | dy = Shift | DR3 | L(i + dx, j + dy) |
| dx = Shift | dy = Shift/2 | UL3 | L(i − dx, j − dy) |
| dx = Shift | dy = Shift/2 | UR3 | L(i + dx, j − dy) |
| dx = Shift | dy = Shift/2 | DL1 | L(i − dx, j + dy) |
| dx = Shift | dy = Shift/2 | DR1 | L(i + dx, j + dy) |
| No Parallel Shift in Uneven Region | | | L(i, j) |

With the above processes, a reconstructed secondary differential value image can be obtained.

An image contour emphasizing process using a reconstructing process method for a secondary differential value image will be described below.

According to a conventional general image contour emphasizing process method, assume that an input image is represented by $I(i,j)$, and that a secondary differential value image of an image obtained with a certain step width is represented by $L(i,j)$. In this case, an emphasized output $O(i,j)$ is given by the following equation:

$$O(i,j)=I(i,j)-k \cdot L(i,j) \qquad \text{Equation (4)}$$

where k is an emphasizing coefficient for adjusting the degree of emphasis.

According to the contour emphasizing process using a reconstructed secondary differential value image according to this embodiment, assume that an input image is represented by $I(i,j)$, and that a secondary differential value image obtained by causing the processes in the step ST1 to the step ST4 to reconstruct the secondary differential value image obtained with a certain step width is represented by $S(i,j)$, an emphasized output $O(i,j)$ is given by the following equation:

$$O(i,j)=I(i,j)-k \cdot S(i,j) \qquad \text{Equation (5)}$$

where k is an emphasizing coefficient for adjusting the degree of sharpness.

Output images obtained by the processes in the above steps are shown in FIG. 18.

Figure 18A:
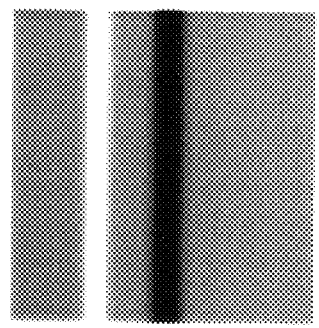
FIG. 18A is an input image.

FIG. 18A shows a blurred image used as an input image. As is apparent from FIG. 18A, the contours of two white and black lines are blurred.

Figure 18B:
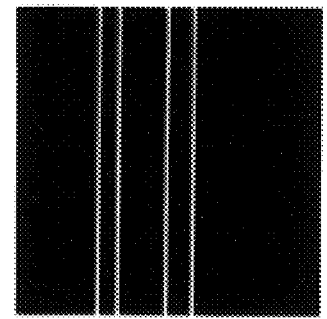
FIG. 18B is an output image subjected to edge detection.

FIG. 18B shows an output image obtained such that edge detection (step ST1) is performed by using the blurred image in FIG. 18A as an input image. The left side of a pair of edges is output in red, and the right side is output in yellow.

Figure 18C:
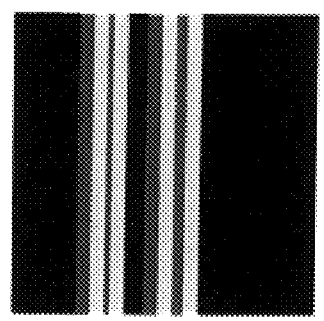
FIG. 18C is an output image in which each region to be emphasized is marked.

FIG. 18C shows an output image obtained such that marking (step ST2) for each region to be emphasized is performed by using the edge-detected image in FIG. 18B as an input. A red portion indicates a pixel which is additionally marked in the left direction of each edge pixel, and a yellow portion indicates a pixel which is additionally marked in the right direction.

Figure 18D:
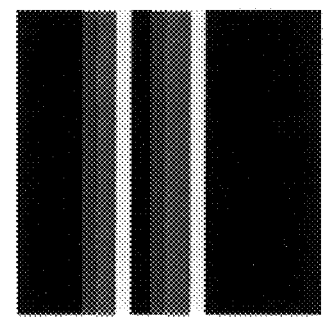
FIG. 18D is an output image in which an uneven region is marked.

FIG. 18D shows an output image obtained such that an uneven region is marked (step ST3) such that a mark image of the region to be emphasized in FIG. 18C is used as an input. A green portion corresponds to an uneven region.

Figure 18E:
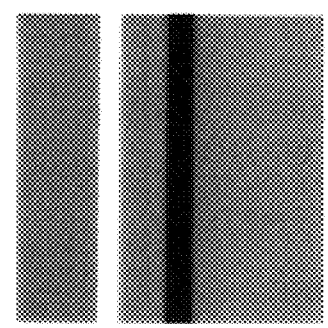
FIG. 18E is an output image subjected to a contour emphasizing process.

FIG. 18E shows an output image obtained such that a secondary differential value image calculated with an arbitrary step width in advance is reconstructed by shift directions of respective pixels of an output in FIG. 18D and a given shift width, and an emphasizing process is performed by using the reconstructed secondary differential value image. As is apparent from FIG. 18E, the contours of two white and black lines clearly appear.

Figure 18F:
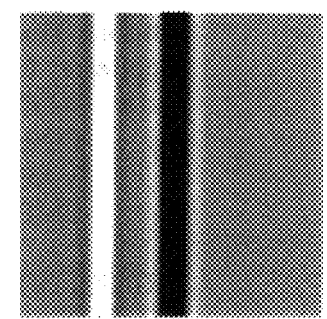
FIG. 18F is an output image obtained by a conventional contour emphasizing process serving as a comparative example.
Figure 19A:
FIG. 19A is an input image.
Figure 19B:
FIG. 19B is an output image obtained when an emphasizing coefficient k is set at 0.3.
Figure 19C:
FIG. 19C is an output image obtained when an emphasizing coefficient k is set at 0.5.
Figure 19D:
FIG. 19D is an output image obtained when an emphasizing coefficient k is set at 0.7.
Figure 20A:
FIG. 20A is an input image.
Figure 20B:
FIG. 20B is an output image obtained when a shift width is set at 0.
Figure 20C:
FIG. 20C is an output image obtained when a shift width is set at 1.
Figure 20D:
FIG. 20D is an output image obtained when a shift width is set at 2.

FIG. 18F is an output image obtained when a secondary differential value image is not reconstructed. This output image is almost the same as an output image obtained by a conventional contour emphasizing process. Comparing with FIG. 18A, the contours of the white and black lines are clear. However, luminance unnaturally changes outside each of the lines, and it is understood that an output value is overshot and undershot.

An output image obtained when the emphasizing coefficient k of Equation (5) for calculating the value 0 is shown in FIG. 19. FIG. 19 shows an output image obtained under the following conditions. That is, a step width is fixed to 2, a threshold value is fixed to 3, a shift width is fixed to 2, and the emphasizing coefficient k is sequentially changed to 0.3, 0.5, and 0.7. FIG. 19A shows an input image. FIG. 19B is an output image obtained when k=0.3, FIG. 19C is an output image obtained when k=0.5, and FIG. 19D is an output image obtained when k=0.7.

FIG. 20 shows an output image obtained under the following conditions. That is, a step width is fixed to 3, a threshold value is fixed to 3, the emphasizing coefficient k is fixed to 0.7, and a shift width used to reconstruct the secondary differential value is sequentially changed to 0, 1, and 2. FIG. 20A shows an input image. FIG. 20B is an output image obtained when a shift width is set to be 0, FIG. 20C is an output image obtained when a shift width is set to be 1, and FIG. 20D is an output image obtained when a shift width is set to be 2.

Figure 21A:
FIG. 21A is an input image.
Figure 21B:
FIG. 21B is an output image obtained by a conventional method.
Figure 21C:
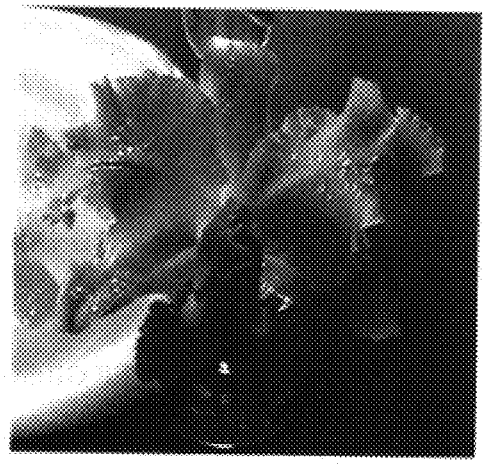
FIG. 21C is an output image obtained by this embodiment.
Figure 22:
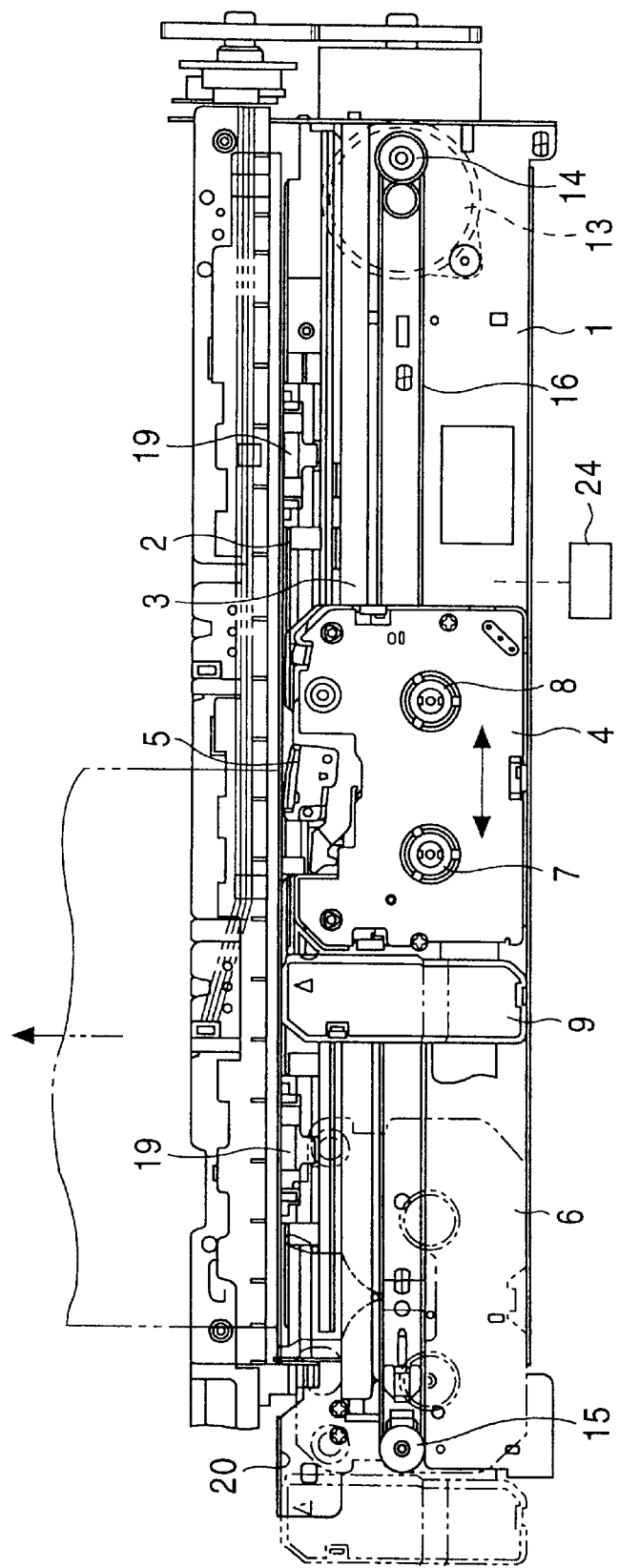
FIG. 22 is a plan view showing an embodiment of a thermal transfer printer for performing recording based on an image contour emphasizing process method according to the present invention.

FIG. 21 is used to compare an output obtained by a conventional contour emphasizing process method with an output image obtained by the contour emphasizing method according to this embodiment. FIG. 21A shows an input image having a blurred portion, FIG. 21B is an output image obtained by the conventional method, and FIG. 21C is an output image obtained by the method according to this embodiment. As is apparent from these drawings, in the output image obtained by the conventional method, the contours of petals are left blurred, and water drops and the like look unnatural. In contrast to this, in the output image obtained by this embodiment, the contour portions of petals are clearly output. As a result, a preferable output image in which water drops and the entire surfaces of the petals did not look unnatural could be obtained.

An embodiment of a thermal transfer printer for performing recording based on the image contour emphasizing process method described above will be described below.

FIGS. 22 to 25 show an embodiment of a thermal transfer printer for performing recording based on an image contour emphasizing process method according to the present invention. In a frame 1 of the thermal transfer printer, a planar platen 2 extending along the longitudinal direction of the frame 1 is arranged. A carriage shaft 3 located in front of the platen 2 and extending parallel to the platen 2 is supported between both the side surfaces of the frame 1. A carriage 4 is connected to the carriage shaft 3 such that the carriage 4 can be reciprocated along the carriage shaft 3, and a thermal head 5 is connected to the distal end portion of the carriage 4 such that the thermal head 5 can be detachably operated opposite to the platen 2. A ribbon cassette 6, including an ink ribbon, for guiding the ink ribbon between the thermal head 5 and the platen 2 is detachably arranged on the upper surface of the carriage 4. A winding bobbin 7 for winding the ink ribbon from the ribbon cassette 6 and a feeding bobbin 8 for feeding the ink ribbon are arranged on the upper surface of the carriage 4.

Figure 23:
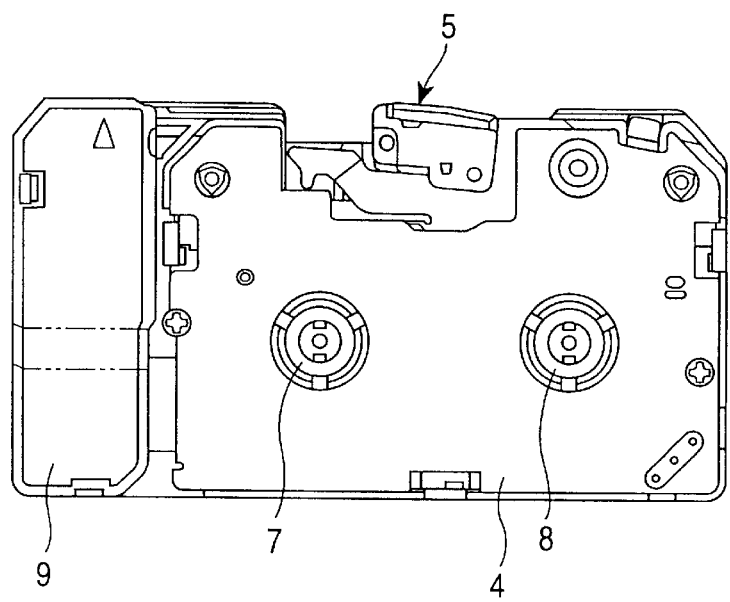
FIG. 23 is a plan view showing a carriage portion in FIG. 22.
Figure 24:
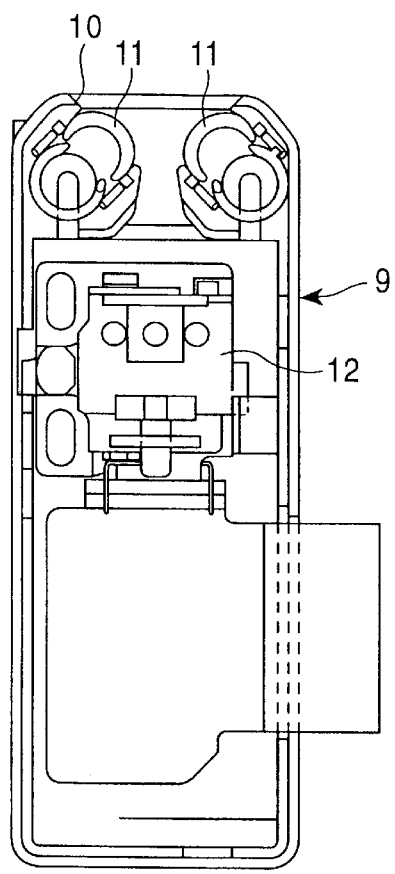
FIG. 24 is a plan view showing an image scanner portion in FIG. 22.

In this embodiment, as shown in FIG. 23, an image scanner 9 is arranged on one side of the carriage 4. As shown in FIG. 24, an opening 10 is formed in a surface of the image scanner 9 opposing the platen 2. Two light-emitting members 11 constituted by lamps or the like are arranged on both the sides of the an opening 10 in the image scanner 9 such that the light-emitting members 11 point to the an opening 10. In the image scanner 9, an image sensor unit 12 for receiving reflected light irradiated from the light-emitting members 11 onto an original to read a predetermined image is arranged.

A carriage drive motor 13 is arranged on the lower side of one end of the frame 1 such that the output shaft of the carriage drive motor 13 pierces the upper surface of the frame 1, and a drive pulley 14 rotatably driven by the carriage drive motor 13 is fitted on the output shaft of the carriage drive motor 13. A coupled pulley 15 is rotatably arranged on the upper surface of the other end of the frame 1, and a carriage drive belt 16 partially connected to the lower surface of the carriage 4 is looped between the drive pulley 14 and the coupled pulley 15. The carriage drive motor 13 is rotatably driven to drive the ribbon cassette 6 through the drive pulley 14, so that the carriage 4 is reciprocated parallel to the platen 2 along the carriage shaft 3.

Figure 25:
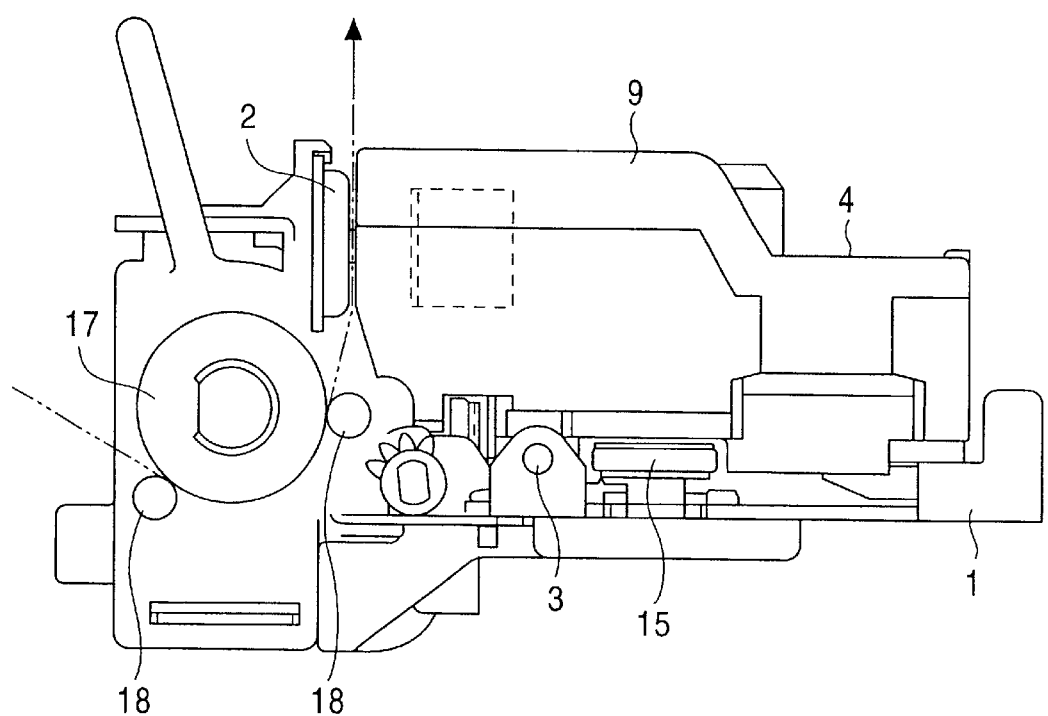
FIG. 25 is a side view of FIG. 22.
Figure 26:
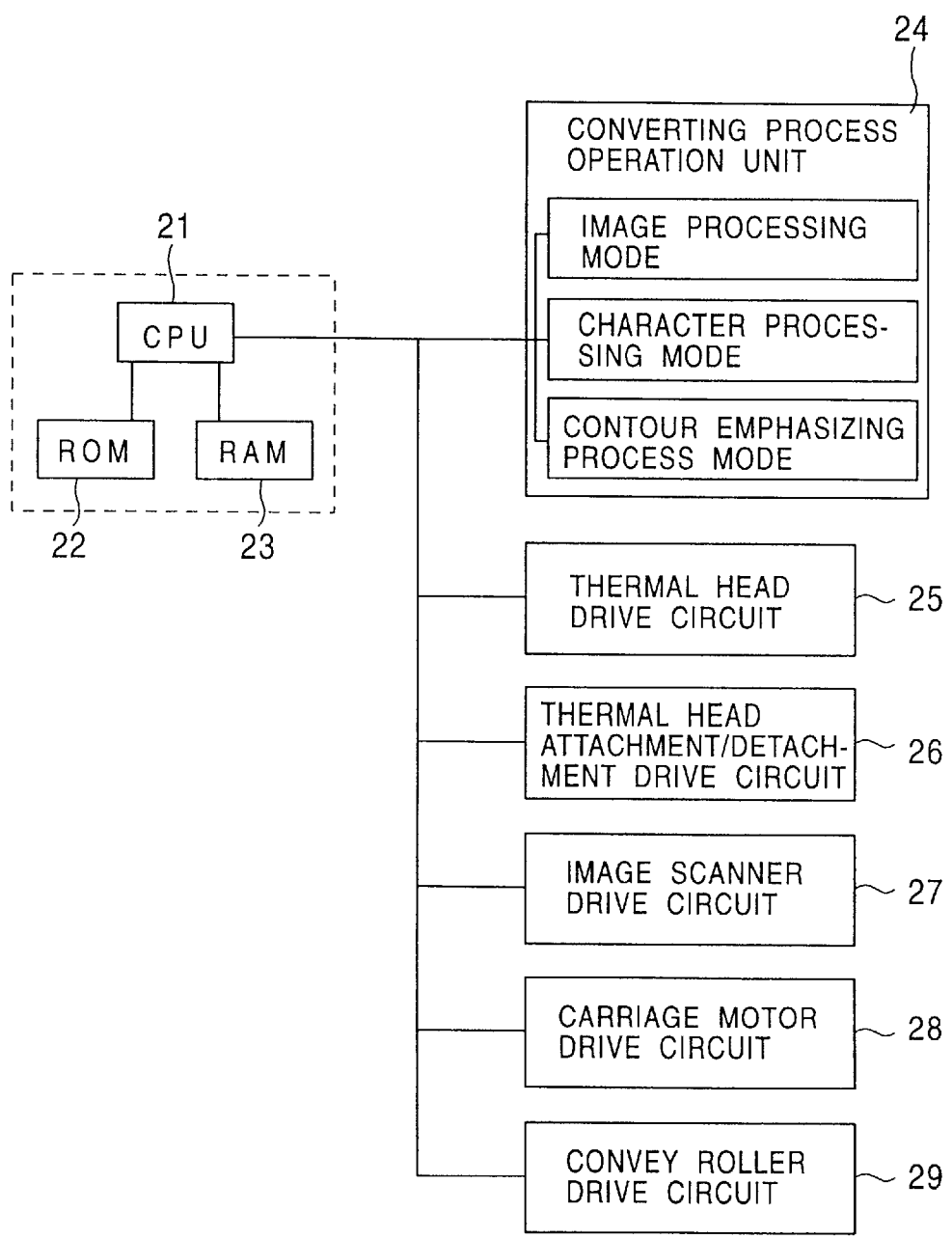
FIG. 26 is a block diagram showing a controller in an embodiment of a thermal transfer printer for performing recording based on an image contour emphasizing process method according to the present invention.
Figure 27A:
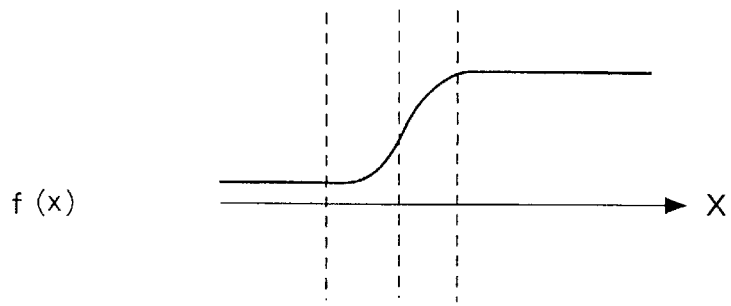
FIGS. 27A to 27D are graphs for explaining a conventional image contour emphasizing process method.
Figure 27B:
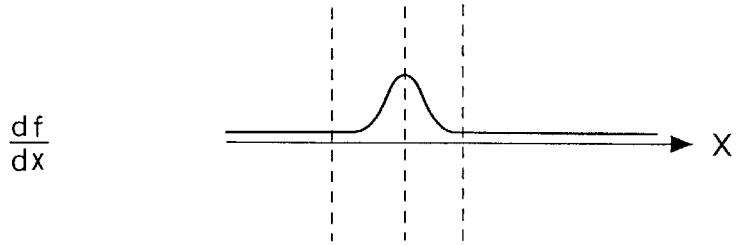
Figure 27C:
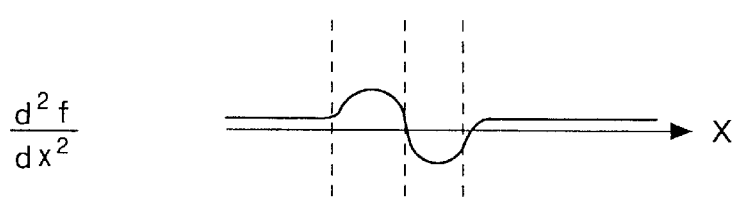
Figure 27D:
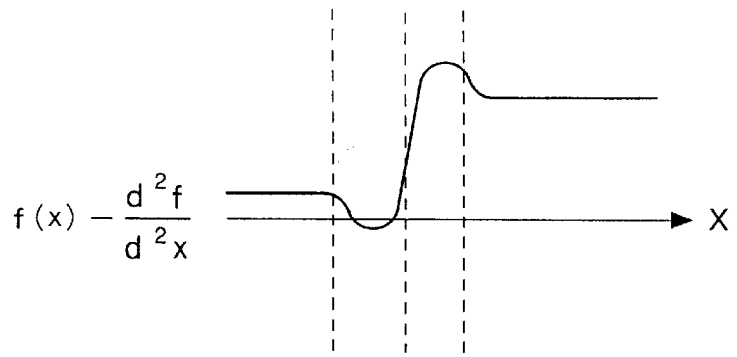

As shown in FIG. 25, a convey roller 17 for conveying a predetermined recording medium at a predetermined speed is arranged under the rear portion of the platen 2, and a plurality of press contact rollers 18 which are in press contact with the convey roller 17 are rotatably arranged under the convey roller 17. In addition, a paper-feeding unit (not shown) is arranged behind the frame 1. When the convey roller 17 is rotatably driven, the recording medium supplied from the paper-feeding unit to a portion between the convey roller 17 and the press contact roller 18 is conveyed between the thermal head 5 and the platen 2. Furthermore, a paper-discharge roller 19 for guiding the printed recording medium is arranged above the platen 2.

A positioning marker 20 is formed on one side of the platen 2 of the frame 1, and the positioning marker 20 is read by the image scanner 9, so that the stop position of the carriage 4 is recognized.

An embodiment of a controller in a thermal transfer printer for performing recording based on the image contour emphasizing process method according to the present invention. A ROM 22 in which conditions of a recording pattern corresponding to the number of gradation levels corresponding to density data such as a dither pattern, conditions required for the contour emphasizing process, and conditions such as Equations (1) to (3) for calculating the primary differential value and secondary differential value of an interest pixel or output equations (4) and (5) for an emphasizing process are stored and a RAM 23 in which various data are stored are connected to a CPU 21.

Image information read by the image scanner 14 with the predetermined number of parts obtained by dividing one pixel is supplied to the CPU 21. A conversion process controller 24 for transmitting a command representing a manner of processing the image information and a command representing a manner of emphasizing a contour portion is connected to the CPU 21. The conversion process controller 24 is designed to be switched to three read data conversion process modes, i.e., an image processing mode, a character processing mode, and a contour line emphasizing process mode. The conversion commands can be arbitrarily selected by a user or can be automatically selected.

The image processing mode is a processing mode for performing selection when an original is image information such as a photograph having a half-tone image. When the image processing mode is set, the CPU 21 arbitrarily selects a predetermined number of read data from read data serving as gradation data of one pixel sent from the image scanner and constituted by N data. The CPU 21 calculates a density gradation value in unit of one pixel from the several read data, and stores the density gradation value as one density data in the RAM 23.

The character processing mode is a processing mode for performing selection when an original is character information. When the character processing mode is set, the CPU 21 simply determines read data serving as gradation data of one pixel sent from the image scanner and constituted by N data as binary data of 0 (white) or 1 (black). The CPU 21 calculates the number of binary data of 0 (white) or 1 (black) existing in one pixel. The CPU 21 finally determines 0 (white) or 1 (black) of one pixel by checking whether the calculated value is larger than a predetermined number or smaller than the predetermined number, i.e., the CPU 21 determines whether this pixel is recorded or not, so that the recording data is stored in the RAM 23.

The contour line emphasizing process mode is a process mode for, when an image in an original is blurred, performing an emphasizing process to the contour line of the image to make the contour line sharp. As the contour line emphasizing process, the above contour portion emphasizing process method according to the present invention is used. More specifically, the primary differential value and secondary differential value of each interest pixel in a read original image are calculated on the basis of Equations (1) to (3) for calculation, the original image is scanned in a horizontal direction and a vertical direction to calculate a pair of pixels in which both the secondary differential values (absolute values) are equal to or larger than a threshold value and the signs of both the primary-differential values are equal to each other, thereby detecting a contour line. In the two normal directions (gradient directions) for a tangent of the contour line to each interest pixel, a secondary differential value at a position shifted from the interest pixel by an arbitrary width is substituted as a secondary differential value located at the interest pixel to reconstruct the secondary differential value image. The output value of the reconstructed secondary differential value image is substituted for the output equation (5) to calculate an output value from the interest pixel.

When an uneven region exists in an original image, in a contour line emphasizing process in the contour line emphasizing process mode, pixels of these contour lines and pixels sandwiched between these contour lines are excluded from pixels subjected to a reconstructing process for a secondary differential value image. An output value is calculated by output equation (4) such that the secondary differential value at the pixel position is directly used.

The CPU 21 is designed to supply control signals to a thermal head drive circuit 25 for performing energizing control for the thermal head 10, a thermal head attachment/detachment drive circuit 26 for operating the thermal head 10 to attach or detach the thermal head 10 to/from the platen 7, an image scanner drive circuit 27 for performing drive control for the image scanner 14, and a carriage motor drive circuit 28, and a convey roller drive circuit 29, respectively.

Therefore, according to the embodiments of the present invention, blurring at the contour portion of an original image is corrected to form an image having a sharp contour, and a high-quality recording image can be obtained.

The present invention is not limited to the embodiments described above, and various modifications can be effected as needed.

As has been described above, according to a reconstructing process method for a secondary differential value image according to the present invention, an image contour emphasizing process method based on the reconstructing process method, and a thermal transfer printer for performing recording based on the contour emphasizing process method, the following advantages can be obtained. That is, blurring at the contour portion of an original image is corrected to form an image having a sharp contour, and a high-quality recording image can be obtained.

What is claimed is:

1. A reconstructing process method for a secondary differential value image, characterized in that a primary differential value and a secondary differential value of each pixel in an original image are calculated, the original image is scanned in horizontal and vertical directions to detect a contour line on the basis of the signs of the primary differential value and the secondary differential value, and a secondary differential value located at a position which is shifted in two normal directions for a tangent to each interest pixel of the contour line from the interest pixel by an arbitrary width is substituted as a secondary differential value located at the interest pixel.

2. A reconstructing process method for a secondary differential value image according to claim 1, characterized in that, when a pair of pixels of contour lines adjacent to each other at a predetermined interval smaller than the width of the pixel exist in an original image, pixels sandwiched between the contour lines are excluded from pixels subjected to a reconstructing process for a secondary differential image.

3. An image contour emphasizing process method characterized in that an output value of a secondary differential value image obtained by a reconstructing process method for a secondary differential value image according to claim 2 is multiplied by an emphasizing coefficient, and the resultant value is added to or subtracted from an output value of an original image to emphasize the contour of the image.

4. A thermal transfer printer comprising the following structures:

an image scanner for reading information of an original image;

a controller for performing a conversion process for the information of the original image read by said image scanner as recording data; and a recording head for performing recording on the basis of the recording data, and said controller having the following characteristics, control being performed such that a primary differential value and a secondary differential value of each pixel in an original image are calculated, the original image is scanned in horizontal and vertical directions to detect a contour line on the basis of the signs of the primary differential value and the secondary differential value, a secondary differential value located at a position which is shifted in two normal directions for a tangent to each interest pixel of the contour line from the interest pixel by an arbitrary width is substituted as a secondary differential value located at the interest pixel to reconstruct the secondary differential value image, an output value of the reconstructed secondary differential value image is multiplied by an emphasizing coefficient, and the resultant value is added to or subtracted from an output value of the original image to calculate an output value of the interest pixel.

5. A thermal transfer printer according to claim 4, further characterized in that when a pair of pixels of contour lines adjacent to each other at a predetermined interval smaller than a predetermined pixel width in an original image, said controller performs control such that the pixels of the contour lines and pixels sandwiched between the contour lines are excluded from pixels subjected to a reconstructing process for a secondary differential image, a secondary differential value at the pixel position is directly used as an output value of the secondary differential value image, the output value of the secondary differential value image is multiplied by an emphasizing coefficient, and the resultant value is added to or subtracted from an output value of the original image to calculate an output value of the interest pixel.

* * * * *